United States Patent [19]

Longaretti

[11] Patent Number: 4,460,333
[45] Date of Patent: Jul. 17, 1984

[54] FURNACE GRATE

[76] Inventor: Carlo Longaretti, Via Bergamo 3, Treviglio (Bergamo), Italy

[21] Appl. No.: 411,879

[22] Filed: Aug. 26, 1982

[30] Foreign Application Priority Data

Mar. 5, 1982 [IT] Italy ............................... 21044/82[U]

[51] Int. Cl.³ ....................... F27D 15/02; F26B 11/02; F27B 9/14
[52] U.S. Cl. ........................................ 432/80; 34/164; 432/134
[58] Field of Search ................... 432/77, 80, 239, 134; 34/164

[56] References Cited

U.S. PATENT DOCUMENTS

| | | | |
|---|---|---|---|
| 3,374,553 | 3/1968 | Gillman | 34/164 |
| 3,624,920 | 12/1971 | Coutelan | 34/164 |
| 3,753,299 | 8/1973 | Schreiner | 34/164 |

Primary Examiner—John J. Camby
Attorney, Agent, or Firm—Barnes, Kisselle, Raisch, Choate, Whittemore & Hulbert

[57] ABSTRACT

A cooler grate for hot cement clinker is provided with a plurality of rows of air holes and the bottom face of the grate is formed with a plurality of fins which undulate between the successive air holes to impart strength to the grate and turbulence to the air directed upwardly through the grate so as to cool the grate to a temperature substantially below the hot clinker on the grate.

13 Claims, 7 Drawing Figures

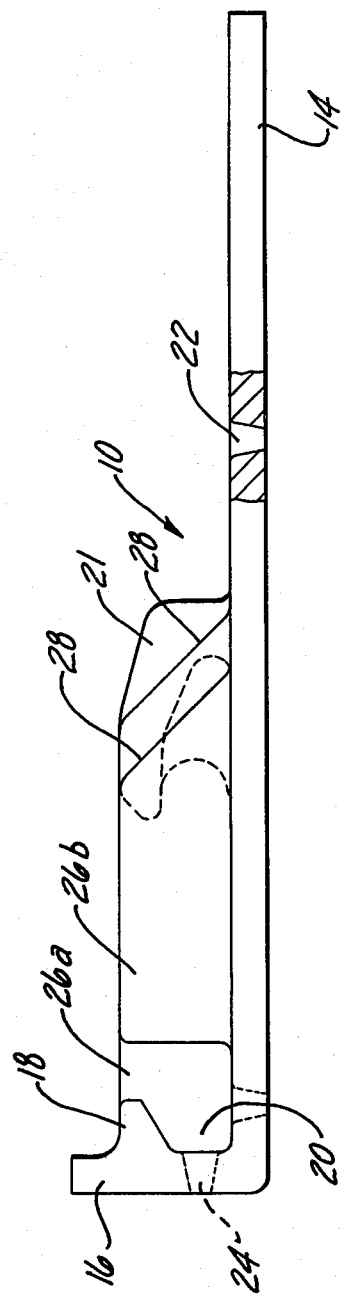
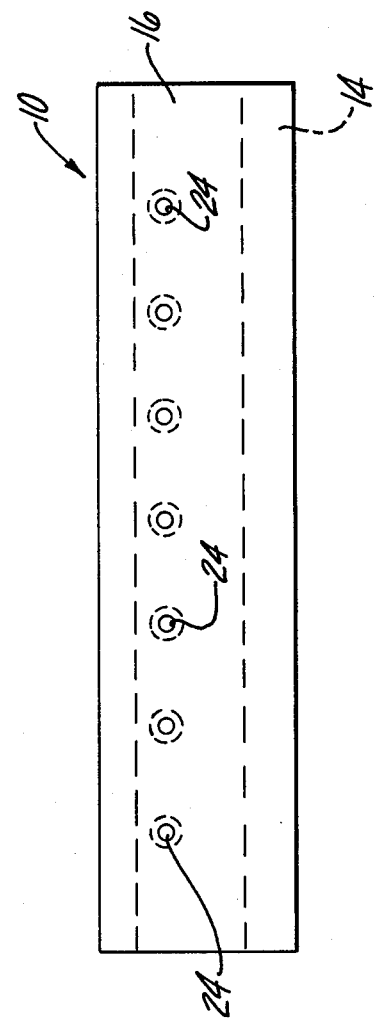
Fig-4
Fig-5

FURNACE GRATE

This invention relates to grates for cooling granular material, such as cement clinker.

In the manufacture of cement raw materials are normally directed through a rotary furnace at a temperature of about 1800° F. or higher to form clinker which is discharged onto a cooling bed to reduce the termperature thereof before the clinker is ground or pulverized. The cooling bed frequently consists of a plurality of overlapping rows of perforated grates through which the air is directed upwardly. The clinker is advanced along the bed of grates by horizontally reciprocating, alternate rows of grates. At the upstream end of the cooling bed the temperature of the clinker deposited thereon may be in the range of 1800°–2000° F. and at the discharge end of the cooling bed the clinker may have been cooled to about 700°–800° F.

In view of the exceedingly high temperatures of the clinker and the fact that the grates on which the hot clinker is supported are reciprocated, it follows that the operation of such a cooling bed subjects the grates to considerable wear and abrasion at relatively high temperatures. When a grate becomes excessively worn it allows the hot clinker to fall through into the cool air chamber below and possibly create a dangerous condition. Therefore, cooling beds formed with conventional grates are subject to frequent stoppages due to the necessity of replacing grates before the equipment is seriously damaged.

The primary object of this invention is to reduce the frequency with which such cooling grates must be replaced.

Another object of the invention is to provide a grate which is capable of withstanding the hot abrasive wear conditions over a substantially greater period of time as compared with grates of conventional design.

A more specific object of the invention is to provide ribs or fins on the underside of the grate which not only strengthen and stiffen the grate, but also impart turbulence to the air before it flows upwardly through the grate to thereby effectively cool the grate.

The grate of the present invention generally comprises a cast metal plate provided with a depending pusher flange extending across the front end thereof. The plate is provided with a plurality of rows of air openings extending vertically therethrough. On the bottom side of the plate a plurality of ribs or fins extend lengthwise thereof between the successive rows of holes. The fins are of zig-zag configuration so that they undulate between the successive holes in the adjacent rows.

Other objects, features, and advantages of the present invention will become apparent from the following description and accompanying drawings, in which:

FIG. 4 is a side elevational view of the grate with sections broken away;

FIG. 5 is a front elevational view of the plate; and

Figure 1:
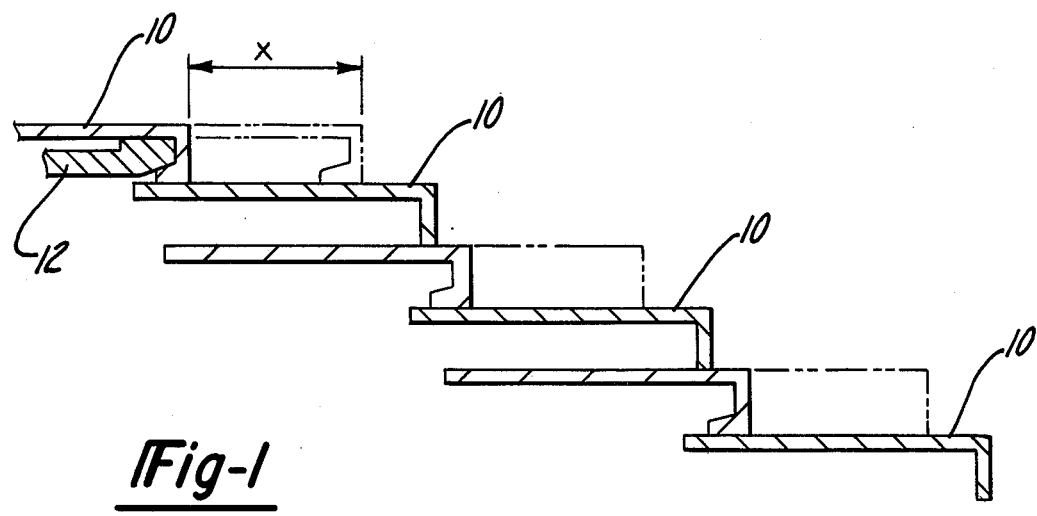
FIG. 1 is a generally schematic view of a clinker cooling bed.

In FIG. 1 there is illustrated in a schematic way a conventional type of cooling bed for cement clinker. The bed consists of a plurality of grates 10 which are arranged in transversely extending rows, the successive rows partially overlapping one another so that the front ends of grates in one row are supported on the rear end portion of the next forward row. The alternate rows of grates are adapted to be reciprocated by any suitable means, such as shown at 12, and through a predetermined distance indicated x so that the clinker is progressively conveyed in a downwstream direction over the entire cooler bed.

Figure 2:
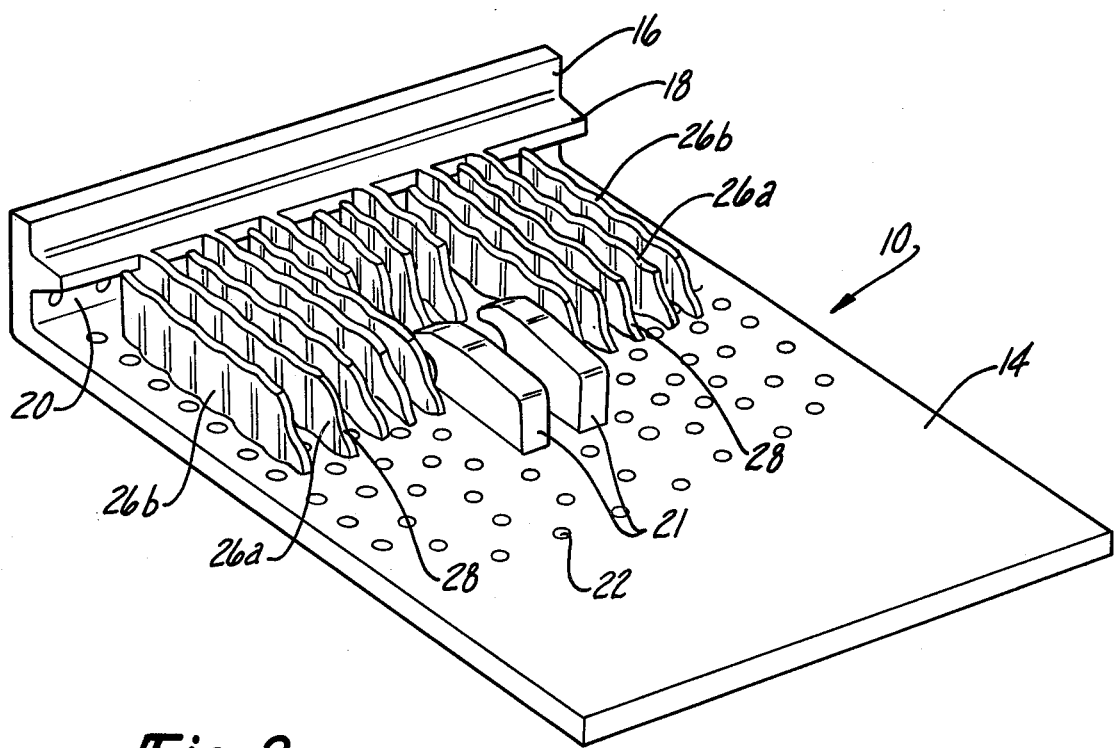
FIG. 2 is a bottom perspective view of a grate of the present invention.

As shown in FIG. 2, each grate comprises a cast metal plate 14 of cast iron or other heat resistant alloy having an integral, downwardly extending pusher flange 16 at its forward end. Flange 16 is formed with a rearward extension 18 that provides a recess 20 for the forward end of a pusher bar, such as illustrated at 12 in FIG. 1. The underside of plate 14 is also provided with a pair of lugs 21 to accommodate a retractor bar (not illustrated).

Figure 3:
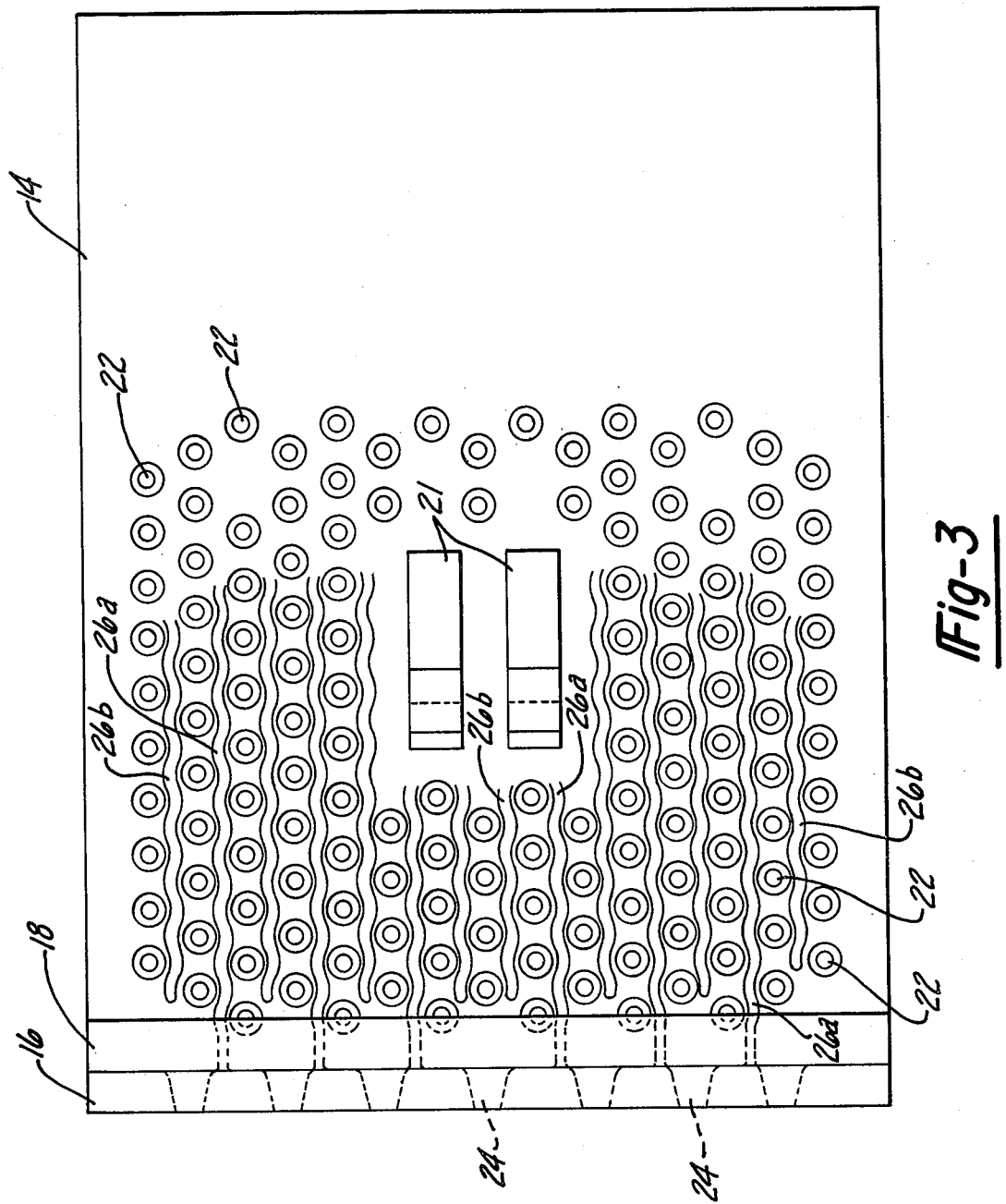
FIG. 3 is a bottom plan view of the grate.

As is best illustrated in FIG. 3, plate 14 is formed with a plurality of air openings 22 which are arranged in rows extending lengthwise of the grate. Air openings 22 are generally regularly spaced in each row and the openings in one row are staggered lengthwise between the openings 22 in the next adjacent row. The spacing between the openings 22 in each row is approximately the same as the spacing between the adjacent rows of openings. Plate 14 is perforated in this manner over at least the front half portion thereof. If desired, the pusher flange 16 is also provided with at least one row of openings 24 that are spaced horizontally between plate 14 and extension 18.

The underside of plate 14 is formed with a plurality of ribs or fins 26 which preferably extend lengthwise between adjacent rows of openings 22. Ribs 26 are of a zig-zag configuration so that they undulate laterally between the successive holes in the adjacent rows of openings 22. Since the openings 22 in adjacent rows are relatively closely spaced and staggered lengthwise and since the ribs 26 undulate between these staggered openings, it follows that the ribs are located directly adjacent the openings 22 in each row. As pointed out previously, the function of ribs 26 is to impart turbulence to the air directed to the underside of the grate and also to strengthen and stiffen the grate. From the standpoint of strength, at least several of the ribs 26 extend forwardly to and are integrally joined with pusher flange 16. In FIG. 3 these ribs are designated 26a. On the other hand, it is preferred to terminate some of the ribs 26 at their forward end at a point spaced rearwardly from pusher flange 16 in order to obtain better circulation on the underside of the grate directly adjacent pusher flange 16. These ribs are designated 26b in FIG. 3. It should be pointed out that, although ribs 26 are preferably cast integrally with plate 14, they can be formed separately and attached to the plate in any suitable manner, such as by welding. Since the forward portion of the grid is most vulnerable to wear and destruction, ribs 26 need not extend rearwardly the full length of the rows of openings 22. Thus, as shown in FIG. 3, the laterally central ribs 26 terminate at their rear ends forwardly of the lugs 21 and the laterally outer ribs 26 extend rearwardly to adjacent the rear ends of lugs 21. The rear ends of ribs 26 can extend vertically or can be inclined as indicated in FIGS. 2 and 4.

By way of example, each grate may have a length of about 20 inches and a width of about 12 inches. In one typical grate pusher flange 16 has a height of about 2½ inches and both pusher flange 16 and plate 14 are about ½ inch in thickness. The rows of openings 22 are spaced apart laterally about ¾ inch and the spacing of the successive holes in a row is also about ¾ inch. Ribs 26 have a height of about 1½ inches and terminate flush with the lower face of extension 18 on pusher flange 16. As shown in FIGS. 3 and 4, holes 22, 24 are preferably tapered and have a diameter at the upper face of the grate of about ¼ inch and a diameter at the bottom face of the grate of about ½ inch. The conical or tapered shape of these openings promotes the unimpeded flow of air through the grate and also tends to prevent clogging of the openings by any granular particles of clinker that may lodge therein.

In operation, the grates are arranged to form a cooling bed generally in the manner illustrated in FIG. 1. Air in a chamber below the grate is blown upwardly through the grates and through the layer of clinker being conveyed on the top side of the grate. Since the ribs 26 have a zig-zag configuration, they impart considerable turbulence to the air flowing therebetween. This turbulent air is therefore in intimate contact with the outer surfaces of the ribs. Since the ribs have a large surface area in comparison to their volume, they are cooled very efficiently by the air forced therebetween. As a consequence, the metal of the grate between the ribs is effectively cooled by conduction and the grate as a whole operates at a temperature of about 200 to about 500° F. below conventional cooling grates. The fact that the grate of the present invention operates at a substantially lower temperature in itself results in greater resistance to heat and lesser damage due to hot wear. In addition, the undulating configuration of the ribs, besides increasing the overall cooling surface area, more readily allows the ribs to expand and contract so as to minimize the thermal expansion differentials between the fins themselves and the plate. It will further be appreciated that, since some of the ribs 26a extend to and are integrally joined with the pusher flange 16, this flange is materially strengthened and its tendency to buckle is substantially reduced. Another important advantage of employing undulating ribs which are connected to the pusher flange 16 is that, even if portions of plate 14 should become so worn in thickness that the ribs themselves are exposed, they will provide support for the clinker deposited on the grate and the spacing therebetween will be sufficiently small to prevent excessive falling of hot clinker through the grate. It therefore follows that a grate constructed in accordance with the present invention will operate satisfactorily for a substantially longer period of time than a conventional grate and will thus reduce the down time and the frequency required for replacing grates in the cooling bed.

Figure 6:
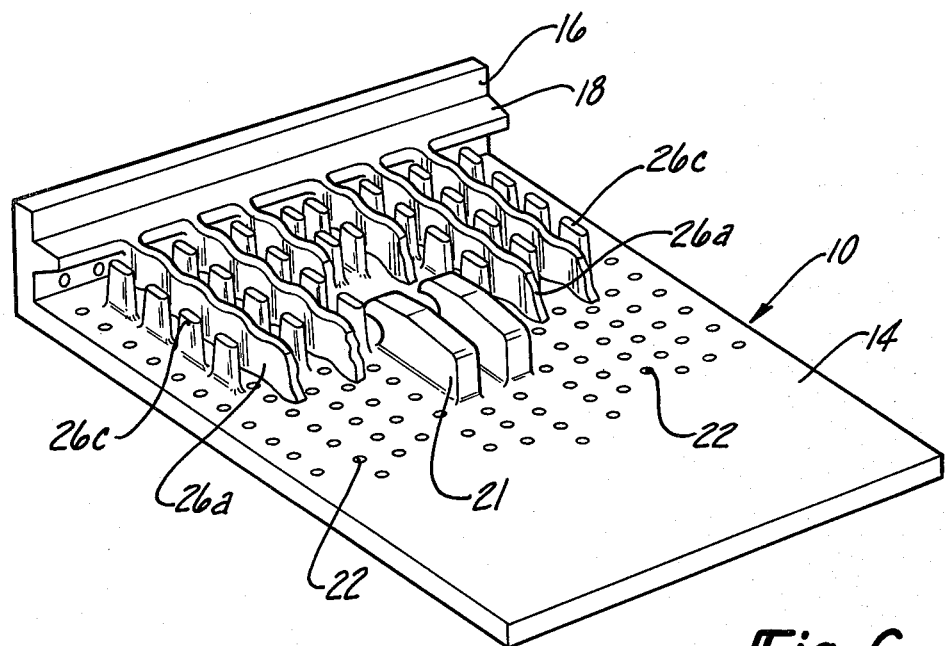
FIGS. 6 and 7 are bottom perspective views of modified forms of grates according to the present invention.
Figure 7:
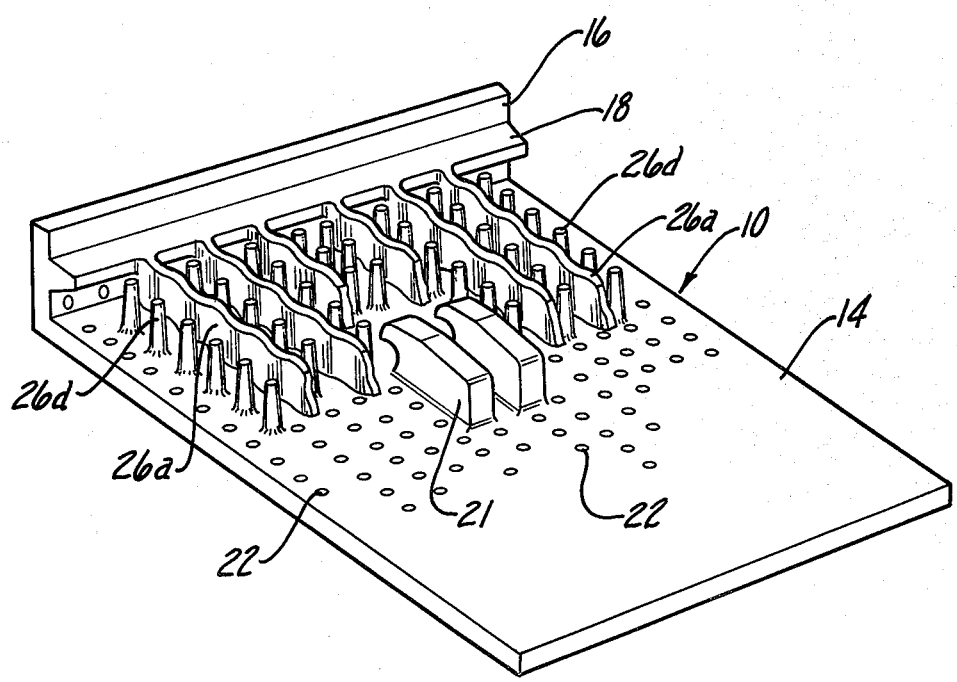

The grates shown in FIGS. 6 and 7 are of the same general construction as shown in FIG. 3, except that all of the ribs are not continuous in length. For example, on the grate shown in FIG. 6 alternate ribs are in the form of a row of longitudinally spaced individual flat fins 26c. In the arrangement shown in FIG. 7 the alternate ribs are in the form of a row of longitudinally spaced individual studs 26d of generally circular cross section. The interrupted ribs formed by fins 26c and studs 26d provide greater air circulation and do not substantially affect the efficiency of the thermal exchange and cooling of the plate 14.

I claim:

1. A grate over which hot clinker is adapted to be conveyed for cooling the clinker comprising, a cast metal plate having a downwardly extending pusher flange at its forward end, said plate having a plurality of air openings extending vertically through the plate, said openings being arranged in laterally spaced rows which extend lengthwise of the plate to adjacent said pusher flange, said plate having on the underside thereof means forming downwardly projecting fins which extend lengthwise of the plate in zig-zag fashion between the laterally spaced rows of air openings, the laterally adjacent fins being spaced apart in un-connected relation throughout their length so that they form on the underside of the plate a plurality of lengthwise continuous passageways having laterally undulating side walls which are spaced apart throughout their length, said passageways being open at their rear ends and extending to adjacent said pusher flange at their forward ends.

2. A cooling grate as called for in claim 1 wherein the fins are cast integrally with the plate.

3. A cooling grate as called for in claim 1 wherein at least some of said fins are connected at their forward ends with said flange.

4. A cooling grate as called for in claim 3 wherein at least some of said fins terminate at their forward ends rearwardly of said flange.

5. A cooling grate as called for in claim 1 wherein the openings in adjacent rows are staggered lengthwise of the rows so that the openings in one row are disposed lengthwise intermediate the openings in the adjacent row.

6. A cooling grate as called for in claim 5 wherein the fins undulate laterally between the successive openings in the adjacent rows.

7. A cooling grate as called for in claim 5 wherein a majority of the openings in each row are regularly spaced and the rows are laterally spaced apart approximately the same distance as the regular spacing between the openings in a row.

8. A cooling grate as called for in claim 5 wherein the rows of openings are closely spaced and the fins undulate such that they are closely adjacent the successive openings in the adjacent rows.

9. A cooling grate as called for in claim 8 wherein the laterally adjacent sections of laterally adjacent fins undulate in opposite directions so that lengthwise successive sections of each passageway are alternately wide and narrow.

10. A cooling grate as called for in claim 1 wherein said pusher flange is provided with air openings extending generally horizontally therethrough and communicating at their inner ends with the forward ends of said passageways.

11. A grate over which hot clinker is adapted to be conveyed for cooling the clinker comprising, a cast metal plate having a downwardly extending pusher flange at its forward end, said plate having a plurality of air openings therein arranged in rows which extend lengthwise of the plate to adjacent the front end thereof, the bottom face of said plate having a plurality of downwardly projecting fins which extend lengthwise of the plate between the rows of openings in zig-zag fashion, said fins being continuous in a lengthwise direction and a second set of fins on the bottom face of said plate extending lengthwise of the plate between the first-mentioned fins, said second set of fins being interrupted in a lengthwise direction.

12. A cooling grate as called for in claim 11 wherein the second set of fins comprise at least one row of longitudinally spaced generally flat fins.

13. A cooling grate as called for in claim 11 wherein said second set of fins comprise at least one row of longitudinally spaced studs which project downwardly from said plate.

* * * * *